UNITED STATES PATENT OFFICE.

HERMAN E. STÜRCKE, OF NEW YORK, N. Y., ASSIGNOR TO HENRY C. HIGGINSON, OF NEWBURG, NEW YORK.

MANUFACTURE OF PLASTER AND RESTRAINERS.

SPECIFICATION forming part of Letters Patent No. 619,911, dated February 21, 1899.

Application filed January 17, 1898. Serial No. 666,970. (No specimens.)

*To all whom it may concern:*

Be it known that I, HERMAN E. STÜRCKE, a citizen of the United States, residing in the city of New York, in the borough of Queens, in the county of Queens and State of New York, have discovered and invented certain new and useful Improvements in the Manufacture of Plaster for Wall-Coverings and the Compounding of Restrainers Therewith, of which the following is a specification.

This invention relates to wall-coverings and the class of compounds used therewith for restraining the setting of anhydrous calcium sulfate or plaster-of-paris. In the use of plaster for wall-coverings and the like the quick setting of the plaster is often a disadvantage, and it has been a common practice for many years to mix with the plaster a glutinous or gelatinous substance, ordinarily glue, artificially combined with hydrated lime and other substances to restrain or retard the setting thereof. Sometimes the restrainer compound is mixed with the plaster or mortar compound containing plaster while the compound is in a wet state, and at other times it is mixed in a dry powdered state with the dry plaster, also in the form of a powder.

The present invention contemplates the production of a restrainer in a dry form capable of being mixed with the plaster or plaster compound when it is in either a wet or dry state, but which is especially adapted for mixing with the plaster in a dry and finely-powdered form, so that the compound or mixture for wall-coverings may be put up in barrels or bags for storing or shipping ready to be wet down for use at the convenience of the plasterer.

In carrying out my invention and following the best procedure with which I am acquainted I dissolve about one hundred (100) pounds of caustic soda, 72° to 76°, in about two hundred (200) gallons of water and heat the solution up to the boiling-point. I then add gradually to the hot solution ground steamed bone. The bone is mixed thoroughly with the alkaline solution and the whole boiled down while being stirred to the consistency of stiff paste. This pasty mass is then thoroughly dried into cakes or masses, after which it is pulverized or ground to a fine powder, so fine that it will pass through a screen of not less than eighty mesh, and preferably through a screen of from one hundred to one hundred and fifty mesh. The bone when thus treated with the soda solution is of such consistency that it is friable and may be readily pulverized when it is thoroughly dried. Artificial heat should be used for the purpose of drying unless proper and sufficient natural heat is available.

After careful investigation and experiment I have discovered that in the powder thus produced there is an organic union of the nitrogenous matter of the bones with the calcium phosphate thereof in a highly-efficient condition for use with plaster, and the necessity of using either glue or hydrated lime artificially combined as a restraining element is avoided. Its properties are such also that when a small portion of this powder is put into water it will mix therewith and readily make a liquid of any desired restraining strength.

The restrainer compound prepared and ground as above described may now be intimately mixed in proper proportions with dry plaster or with a dry compound containing dry plaster, the proportion of the restrainer to the plaster varying with the needs of the user. If the setting of the plaster is to be retarded for a considerable time, more of the restrainer will be required; if for a less time, less of the restrainer will be required. For example, three parts, by weight, of the above restrainer compound to one thousand parts, by weight, of plaster will restrain the setting of the same about one hour and a half.

The composition of matter produced by the compounding of plaster-of-paris with bone treated with an alkali and pulverized, as described, is different and superior to any other composition for a wall-plaster heretofore made or used.

By "steamed bone" is meant green bone which has been steamed to remove the more readily-soluble gelatinous matter. This steamed bone still retains a sufficient percentage of gelatinous matter to serve the purposes for restraining plaster, the phosphates of the bone serving as a body substance; but the gelatinous substance in the bone is not normally soluble to an appreciable extent in water at ordinary temperatures until made so by treatment with an alkali. The green bone may of course be employed in lieu of steamed bone; but it is more costly than the latter and has not sufficient body substance in proportion to the gelatinous matter to enable the restrainer to be mixed conveniently with the plaster. Hence if green bone be employed in lieu of steamed bone some clay as a body substance should be added to it in quantity proportionate with the excess of gelatinous matter. The clay should be pulverized or added before the operation of pulverizing.

The treatment with caustic soda or other alkali is to render the gelatinous substance in the bone very readily soluble in water at the normal or ordinary temperatures and to thus fit it for use as a restrainer for plaster.

I do not wish to limit myself to caustic soda in carrying out my invention, because other alkalies may be employed with good results— as caustic potash, for example; but I find caustic soda gives the best results and to be satisfactory also from the point of economy. The alkali or alkaline earth employed should be readily soluble in water and preferably more readily soluble in hot than cold water.

When the powdered restrainer compound is mixed with the plaster-of-paris or other plaster, care should be taken that it is thoroughly dry, and for this purpose artificial heat may be employed after the process of pulverizing, if desired; but I do not consider such drying a necessary part of my process, as the material must be thoroughly dried in order to properly powder it, as hereinbefore stated. The object is to have the restrainer-powder in condition to mix intimately with the plaster, which it cannot do unless in a finely-divided state, which is best obtained by having it very dry.

I do not wish to be understood herein as claiming to have been the first to treat bone and cartilaginous matter generally with caustic soda, as I am aware that has been done in the production of fertilizers. My efforts have been directed in an entirely different art, and I have discovered that calcium phosphate and gelatinous matter constitute ingredients having superior properties as a restrainer of the rapid-setting qualities of plaster-of-paris and that this product is readily produced by the process described by me in a form suitable for such use, so that I am enabled by pulverizing the dried solution of alkali and bone to produce a highly-useful article entirely distinct from a fertilizer, the latter being a coarse lumpy article of commerce, unsuggestive and unsuited in any of its known forms for the purposes to which I am enabled to apply the calcium phosphate and glutinous constituents of the bone.

Having thus described my invention, I claim—

1. The herein-described dry powdered restrainer for plaster, consisting essentially of the residue of an evaporated solution of bone in alkali reduced to the fineness of ordinary plaster-of-paris, the gelatinous matter thereof being readily soluble in water at ordinary temperature, substantially as and for the purposes described.

2. The composition of matter herein described, consisting essentially of plaster-of-paris in the form of a dry powder and dry, powdered, bone, in which the gelatinous matter is readily soluble in water at ordinary temperatures, substantially as and for the purposes set forth.

3. The composition of matter herein described, consisting essentially of plaster-of-paris, powdered calcium phosphate and gelatinous matter substantially as and for the purposes set forth.

In witness whereof I have hereunto signed my name this 4th day of January, 1898, in the presence of two subscribing witnesses.

HERMAN E. STÜRCKE.

Witnesses:
  PETER A. ROSS,
  HENRY CONNETT.